UNITED STATES PATENT OFFICE.

WALTER O. SNELLING, OF PITTSBURGH, PENNSYLVANIA.

MANUFACTURE OF RUBBER DERIVATIVES.

1,288,723.  Specification of Letters Patent.  Patented Dec. 24, 1918.

No Drawing.  Application filed November 15, 1915.  Serial No. 61,534.

*To all whom it may concern:*

Be it known that I, WALTER O. SNELLING, a citizen of the United States, and a resident of Pittsburgh, in the county of Allegheny and State of Pennsylvania, have invented a new and useful Improvement in the Manufacture of Rubber Derivatives, of which the following is a specification.

My invention relates to the manufacture of plastic and resinous materials from natural substances containing rubber, and has special reference to the preparation of soft and masticatory plastics from gutta-percha and from Pontianak and other low-grade rubbers.

One object of my invention is to provide a simple, inexpensive and rapid process of transforming natural rubbers into soft, ductile and very plastic substances which resemble gum chicle in their properties, and which may be used as substitutes for natural chicle in the manufacture of chewing gum.

Another object of my invention is to provide a new and satisfactory series of chewing gums which shall be cheap to manufacture and which, in their chewing properties and freedom from unpleasant taste, shall be fully equal to chewing gum made from pure natural chicle.

A further object of my invention is to provide a process of transforming natural substances containing rubber and resins into products containing high proportions of resin and less than normal proportions of rubber.

My basic discovery is that elastic colloids such as the natural rubbers and guttas can be transformed into soft and plastic products by reacting upon them with reagents capable of saturating some of the residual or unsaturated bonds that exist in the natural substances. Rubber itself, for example, is composed of molecular aggregates of relatively large size, the constituent molecules of which appear to be linked together by free or unsaturated bonds. The firmness and elasticity of substances of this class, as well as their ability to resist rupturing stresses, depend upon the number and intensity of these free bonds. When such a substance is mechanically torn apart, with consequent rupture of a large number of residual bonds, these bonds partially satisfy one another on the broken surfaces, but are still enough in evidence to cause the two fresh surfaces to unite firmly when pressed together, without substantial loss of elasticity.

It results from the considerations just set forth in brief, that any means whereby the residual or unsaturated bonds of an elastic colloid become saturated will destroy the elasticity of the substance to a greater or less degree. My present invention accomplishes this result by the aid of certain reagents and manipulations, thereby producing soft and masticatory plastic products.

In its broad aspect, my invention contemplates the use of any reagent capable of saturating a considerable portion of the residual bonds of naturally elastic colloids. Specifically, I find that oxygen and oxidizing agents will rapidly perform this function when applied under certain conditions, and also that the halogens, particularly gaseous chlorin, are well suited to my present purpose. The use of these substances, and of all other suitable reagents, is intended to be covered by the broader of the subjoined claims.

The fact that rubbers react with oxygen is well known, and has been frequently discussed by investigators into the chemistry of rubber. It is known, for example, that ozone, hydrogen peroxid and nitric acid will act upon rubber to change it into ozonids and brittle resins. It is also well recognized that both raw and vulcanized caoutchouc are quickly destroyed by atmospheric air, in the presence of catalytic substances such as the fatty oils, and by the action of ozone or hydrogen peroxid.

According to one phase of my present invention, I am able to transform natural rubbers into oxidation products which differ widely from the oxidation products hitherto known, and which are soft plastics, having little or no elasticity, and well adapted to the manufacture of chewing gum. This part of my invention therefore comprehends broadly the use of oxidized rubbers in the manufacture of chewing gum and allied products.

Another discovery which contributes to my present invention is that when rubber is oxidized in the presence of a considerable amount of resin, the resulting product is very different in its properties from rubber that has been oxidized in the absence of resin or with but little resin present. This appears to be caused by a mutually solvent action between the oxidation products of the resins and of the rubber, resulting in a final product which, instead of being brittle and non-masticatory, as are most of the oxidation products of rubber alone, are plastic, masticatory and of comparatively low melting point. These properties combine to render my products eminently well suited for use as substitutes for chicle in the manufacture of chewing gum.

In practising this modification of my process, I treat natural rubbers and guttas with active oxidizing agents such as ozone, hydrogen peroxid or nitrous oxids, in the presence of considerable amounts of water and preferably with thorough mechanical working. I prefer to employ gums which are rich in resins, such as Pontianak rubber, and it is desirable, though not necessary, that at least as much resin as rubber be present. I find that a very brief treatment with ozone or other active oxidizing agent is sufficient to begin the oxidation, which then proceeds rapidly without further attention, the material being simply exposed to the air, preferably in the form of thin sheets. If the oxidizing action becomes too slow before the material has reached the required degree of plasticity, it may be again worked mechanically to expose fresh surfaces, given another brief treatment with the oxidizing agent, and exposed once more to the air.

The rubber present in the natural gum is transformed by the process outlined above to a greater or less degree, according to the length of the oxidizing treatment. It is converted partly into water-insoluble aldehydes and organic acids of high molecular weight, partly into esters of such acids, and partly into solid and semi-solid resinous bodies, and these products appear to soften the original resins, and to favorably alter their properties. Some of the original resins themselves are transformed to some extent by the oxidizing treatment into other resins of less molecular weight and of greater plasticity, probably through an intermediate formation of ozonids which are quickly broken up in the presence of water.

The presence of certain catalysts materially increases both the thoroughness and the rapidity of the oxidizing process. For this purpose, I have employed oleic acid, salts of copper and of iron, notably copper oleate, and also certain fatty oils, such as palm oils. The well-known varnish driers, such as copper resinate, manganese resinate and the like, are also suitable for this purpose. The catalytic agents are added to the rubber to be treated in small proportions, about one-half of one per cent. of the weight of the rubber being sufficient. Other conditions which promote the present oxidizing process are moderate heat, kept low enough to avoid decomposition of ozone if this reagent is used, the presence of light and thorough mechanical maceration.

In practising one specific example of my process, I macerate natural Pontianak rubber in water and roll it into thin sheets, about one mm. in thickness. These sheets, while still containing moisture, are exposed to the action of ozone or strongly ozonized air. The treatment with ozone may continue until the rubber is completely destroyed, but I prefer to remove the sheets from contact with the ozone after a few minutes and to expose them to the air, when the process of oxidation proceeds rapidly. A second maceration in water and treatment with ozone will hasten the oxidation, and when the desired degree of plasticity is obtained, the product is washed thoroughly with water. The ozone imparts to the product a rather unpleasant taste, which can be easily removed by washing with very dilute caustic soda or other alkali before the final washing with water, or by boiling the product in water for a few moments.

Another modification of the oxidizing process consists in incorporating in the rubber a small amount of an alkaline earth metal peroxid, and treating the mixture with a mineral acid, to decompose the peroxid and liberate hydrogen peroxid which, in the presence of the aqueous liquid, rapidly produces the softening effects described above. For example, I may incorporate 2 parts of barium peroxid in 100 parts of Pontianak rubber and treat the mass with dilute hydrochloric acid. The hydrogen peroxid thus evolved in intimate contact with the rubber will quickly begin the oxidation process. This strong oxidizing effect may be continued sufficiently to complete the transformation of the rubber into a masticatory mass, and when the proper degree of plasticity is reached, the product is macerated thoroughly with water to interrupt the oxidizing reaction and to free the product from barium chlorid. The oxidizing effect of barium peroxid may, if desired, be employed only long enough to start the oxidation process, which is thereafter completed by exposing the rubber to the air in the manner described above in connection with the use of ozone.

The oxidation of rubbers can also be started, for my present purpose, by treatment with very weak nitric acid, or, preferably, with nitrous fumes.

Four distinct effects result from the above-described oxidation treatment of rubber-resin mixtures. These are, in brief, (a) alteration of the original resins present, by the formation and partial destruction of ozonids, with the formation of new resins of lower melting point and greater plasticity; (b) oxidation of the rubber originally present, with consequent reduction of the amount of resilient material present in the product; (c) the production, from the rubber, of organic acids, aldehydes and esters, having a softening and solvent effect upon the other resins present, and (d) the production of soft and semi-liquid resins from the rubber itself, such resins having the effect of greatly softening the original resins of the gum, and of lowering the melting point of the product. These transformations, which I believe that I have now produced for the first time, combine to produce products of great plasticity, having close resemblance to gum chicle. In fact, since natural chicle is essentially a mixture of organic acids, esters and aldehydes of the same general character as those developed in my present process, it is probable that I have substantially reproduced chicle itself. Whether or not this is the fact, it is certain that my products are the full equivalents of chicle in the manufacture of chewing gum, and that they differ to a most remarkable degree from the tough, resilient starting materials.

They may be worked up into chewing gum by the methods ordinarily applied to the treatment of chicle, with the usual additions of sugar and flavoring agents such as oil of peppermint, oil of wintergreen and the like.

When chlorin is employed as the bond-saturating agent in the treatment, for example, of Pontianak rubber, I proceed, much as in the above-described treatment with ozone, by macerating the natural rubber in water and rolling it into thin sheets. I then expose the sheets to the action of gaseous chlorin until the material becomes sufficiently plastic, and finally wash the product with a weak alkaline solution and with water to remove any adhering chlorin and ill-tasting, soluble chlorination products that may be present.

The plastic products prepared according to the above methods may be dissolved and extended by means of various solvents, with the production of technically valuable liquid coating compositions. For example, my ozonized products of Pontianak rubber may be worked up with turpentine to an opalescent fluid which forms an excellent waterproofing agent for the treatment of cement structures and for similar purposes.

In the subjoined claims, the term "rubber" refers to the chemical compound of that name, as distinguished from the natural gums which are commonly known as rubbers, and which contain other substances in addition to rubber itself. When reference is made to gums of this class, the term "natural rubber" is employed.

While I have described, in the specific examples given above, the application of my process to the treatment of Pontianak rubber, it is to be understood that my process may also be practised with equal success with other rubber-containing substances which also include considerable proportions of resins. It is therefore to be understood that no limitations are to be imposed upon my invention except such as are indicated in the appended claims.

I claim as my invention:

1. A plastic oxidation product of a natural rubber.

2. A masticatory material comprising a plastic oxidation product of a natural rubber.

3. A masticatory material comprising a plastic oxidation product of Pontianak rubber.

4. A substitute for gum chicle comprising a plastic and substantially non-resilient oxidation product of a natural rubber.

5. An oxidation product of a natural rubber that is plastic, substantially non-resilient, and substantially non-adhesive to wet surfaces.

6. An oxidation product of a natural rubber, the said product being plastic and containing a relatively large amount of resin and a relatively small amount of rubber.

7. Chewing gum comprising a plastic oxidation product of a natural substance containing resin and rubber, the said oxidation product having a greater proportion of resin and a smaller proportion of rubber than the said natural substance.

8. Chewing gum comprising a plastic oxidation product of Pontianak rubber, the said oxidation product having a greater proportion of resin and a smaller proportion of rubber than natural Pontianak rubber.

9. A resinous substance adapted to the manufacture of chewing gum, and comprising a plastic oxidation product of a natural rubber, in which the rubber of the original material is substantially all converted into resin.

10. In the manufacture of chewing gum from natural colloids, the process that comprises reacting upon a natural colloid under such conditions as to saturate at least a portion of the residual bonds of the said colloid.

11. The process that comprises reacting upon a natural rubber, under such conditions as to decrease the elasticity and increase the plasticity of the said rubber, with a non-alkaline reagent capable of producing the said effects.

12. The process of preparing rubber derivatives which comprises exposing a mixture of rubber and resin to an oxidizing agent under such conditions as to destroy at least partially the elasticity of the rubber.

13. The process of preparing plastic products from natural rubbers that comprises treating a natural rubber with an active oxidizing agent in the presence of water.

14. The process of preparing plastic products from natural rubbers that comprises treating a natural rubber with ozone in the presence of water.

15. The process of preparing plastic products from natural rubbers that comprises treating a natural rubber with ozone and thereafter bringing the material into contact with water.

16. The process of preparing plastic products from natural rubbers that comprises treating a natural rubber with an agent capable of increasing the plasticity and decreasing the elasticity of such rubber, and treating the resulting product to remove unpleasant taste.

17. The process of preparing plastic products from natural rubbers that comprises treating a natural rubber with an active oxidizing agent in the presence of water, and exposing the treated material to the air.

18. The process of preparing plastic products from natural rubbers that comprises treating a natural rubber with ozone in the presence of water, and exposing the treated material to the air.

19. The process of preparing plastic products that comprises treating rubber with an active oxidizing agent in the presence of a substantial amount of resin and under such conditions as to decrease the elasticity of the said rubber.

20. The process of preparing plastic products that comprises treating rubber, in the presence of at least an equal amount of resin, with an active oxidizing agent.

21. The process of preparing plastic products from natural rubbers that comprises treating a natural rubber with an active oxidizing agent, and mechanically working the resulting material.

22. The process of preparing plastic products from natural rubbers that comprises forming a natural rubber into sheets, treating the sheets with ozone in the presence of water, exposing the treated sheets to the air, rolling the material into sheets having fresh surfaces exposed, and again treating the sheets with ozone and with air.

23. In the manufacture of chewing gum, the process that comprises exposing rubber to an oxidizing agent under such conditions as to at least partially destroy the elasticity of the said rubber, and mixing the resulting product with flavoring material.

24. The process that comprises treating a natural rubber with an oxidizing agent in the presence of water and of a catalyst capable of promoting the oxidization of the said rubber.

25. The process that comprises treating a natural rubber with an oxidizing agent in the presence of water and a small amount of copper oleate.

In testimony whereof, I have hereunto subscribed my name this 12th day of November, 1915.

WALTER O. SNELLING.

Witnesses:
M. R. McKeown,
J. G. Kaiser.